US012803619B2

(12) United States Patent
Kanaya et al.

(10) Patent No.: US 12,803,619 B2
(45) Date of Patent: Nov. 17, 2026

(54) WIRELESS COMMUNICATION DEVICE AND WIRELESS COMMUNICATION METHOD

(71) Applicant: Panasonic Intellectual Property Corporation of America, Torrance, CA (US)

(72) Inventors: Hiroyuki Kanaya, Ishikawa (JP); Yoshio Urabe, Nara (JP); Jun Minotani, Ishikawa (JP); Tomofumi Takata, Ishikawa (JP); Takashi Iwai, Ishikawa (JP); Takayuki Nakano, Ishikawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 914 days.

(21) Appl. No.: 17/634,082

(22) PCT Filed: Aug. 13, 2020

(86) PCT No.: PCT/JP2020/030815

§ 371 (c)(1),
(2) Date: Feb. 9, 2022

(87) PCT Pub. No.: WO2021/039428

PCT Pub. Date: Mar. 4, 2021

(65) Prior Publication Data

US 2022/0352930 A1 Nov. 3, 2022

(30) Foreign Application Priority Data

Aug. 29, 2019 (JP) ................................ 2019-157100

(51) Int. Cl.
*H04B 7/024* (2017.01)
*H04B 7/06* (2006.01)

(52) U.S. Cl.
CPC .......... *H04B 7/024* (2013.01); *H04B 7/0617* (2013.01)

(58) Field of Classification Search
CPC .............................. H04B 7/024; H04B 7/0617
(Continued)

(56) References Cited

U.S. PATENT DOCUMENTS 9,532,367 B2 12/2016 Nagata et al.
2011/0013710 A1* 1/2011 Xiao .................... H04L 1/0026 455/7

(Continued)

FOREIGN PATENT DOCUMENTS

EP 2410696 A1 1/2012
JP 2016-029861 A 3/2016

(Continued)

OTHER PUBLICATIONS

Extended European Search Report, dated Aug. 18, 2022, for European Application No. 20857936.7-1215, 8 pages.

(Continued)

*Primary Examiner* — Chi Tang P Cheng
(74) *Attorney, Agent, or Firm* — Seed Intellectual Property Law Group LLP

(57) ABSTRACT

The present invention appropriately controls settings of feedbacks to a plurality of transmission sources. This wireless communication device comprises: a reception circuit for receiving a plurality of wireless signals transmitted by a plurality of transmission sources; and a control circuit for controlling settings of feedbacks with respect to the plurality of radio signals, depending on differences in reception quality of the plurality of wireless signals.

13 Claims, 19 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2012/0033571 | A1* | 2/2012 | Shimezawa | H04J 11/0053 370/252 |
| 2012/0263068 | A1 | 10/2012 | Morimoto et al. | |
| 2012/0281556 | A1* | 11/2012 | Sayana | H04L 5/0057 370/252 |
| 2013/0017825 | A1* | 1/2013 | Li | H04L 1/0029 455/425 |
| 2013/0115985 | A1* | 5/2013 | Davydov | H04B 7/0632 455/501 |
| 2014/0106793 | A1 | 4/2014 | Lee et al. | |
| 2016/0119909 | A1 | 4/2016 | Fukuzono et al. | |
| 2016/0173401 | A1* | 6/2016 | Srinivasan | H04L 49/201 370/235 |
| 2017/0347359 | A1 | 11/2017 | Yang et al. | |
| 2019/0261278 | A1 | 8/2019 | Gupta et al. | |
| 2020/0314220 | A1* | 10/2020 | Segev | G01S 13/765 |

FOREIGN PATENT DOCUMENTS

| | | | |
|---|---|---|---|
| JP | 2018023129 | A | 2/2018 |
| WO | 2010/122818 | A | 10/2010 |

OTHER PUBLICATIONS

English Translation of Chinese Search Report, dated Nov. 9, 2023, for Chinese Patent Application No. 2020800572818. (3 pages).

Indian Office Action, dated Dec. 29, 2023, for Indian Patent Application No. 202227007166. (6 pages).

"Heterogeneous Network Capacity Expansion Technologies for Further Development of LTE/LTE-Advanced," *NTT DOCOMO Technical Journal 21*(2):10-17, Jul. 2013.

Guo et al., Huawei Technologies, "AP Coordination in EHT," IEEE 802.11-19/0103r1, Mar. 11, 2019 (11 pages).

IEEE P802.11ax™/D4.0, "Draft Standard for Information technology—Tele-communications and information exchange between systems Local and metropolitan area networks—Specific requirements; Part 11: Wireless LAN Medium Access Control (MAC) and Physical Layer (PHY) Specifications; Amendment 1: Enhancements for High Efficiency WLAN," Feb. 2019 (746 pages).

International Search Report, mailed Oct. 20, 2020, for International Application No. PCT/JP2020/030815 (5 pages).

Park et al., LG Electronics, "Multi-AP Transmission Procedure," IEEE 802.11-19/0448r1, Mar. 11, 2019 (18 pages).

Ericsson, ST-Ericsson, "Implicit CSI Feedback Framework for DL CoMP," R1-122835, Agenda Item: 7.5.1.2, 3GPP TSG-RAN WG1 #69, Prague, Czech Republic, May 21-30, 2012. (6 pages).

* cited by examiner

| Field | Size (bits) | Meaning |
|---|---|---|
| Average SNR of Space-Time Stream 1 | 8 | Signal-to-noise ratio at the beamformee for space-time stream 1 averaged over all data subcarriers. See Table 9-80 (Average SNR of Space-Time Stream i subfield). |
| ... | | ... |
| Average SNR of Space-Time Stream Nc | 8 | Signal-to-noise ratio at the beamformee for space-time stream Nc averaged over all data subcarriers. See Table 9-80 (Average SNR of Space-Time Stream i subfield). |
| Compressed beamforming feedback matrix $V$ for subcarrier $k$ = $scidx(0)$ | $Na \times (b_\phi + b_\psi)/2$ | Compressed beamforming feedback matrix defined in Table 9-74 (Order of angles in the Compressed Beamforming Feedback Matrix subfield when used in a non-S1G band). |
| Compressed beamforming feedback matrix $V$ for subcarrier $k$ = $scidx(1)$ | $Na \times (b_\phi + b_\psi)/2$ | Compressed beamforming feedback matrix defined in Table 9-74 (Order of angles in the Compressed Beamforming Feedback Matrix subfield when used in a non-S1G band). |
| Compressed beamforming feedback matrix $V$ for subcarrier $k$ = $scidx(2)$ | $Na \times (b_\phi + b_\psi)/2$ | Compressed beamforming feedback matrix defined in Table 9-74 (Order of angles in the Compressed Beamforming Feedback Matrix subfield when used in a non-S1G band). |
| ... | | ... |
| Compressed beamforming feedback matrix $V$ for subcarrier $k$ = $scidx(Ns - 1)$ | $Na \times (b_\phi + b_\psi)/2$ | Compressed beamforming feedback matrix defined in Table 9-74 (Order of angles in the Compressed Beamforming Feedback Matrix subfield when used in a non-S1G band). |

FIG. 3

| Comparison result | Type of feedback information |
|---|---|
| $\Delta Pn > Xcsr$ | Reception level |
| $Xcsr \geqq \Delta Pn > Xcbf$ | Information on beamforming |
| $Xcbf \geqq \Delta Pn > Xjt$ | Feedback information unnecessary |
| $Xjt \geqq \Delta Pn$ | Type designated by NDPA |

FIG. 9

| Indicated coordination scheme | Supported coordination scheme |
|---|---|
| CSR | CSR, DPB |
| CBF | CSR, CBF, DPB |
| DPB | DPB |
| JT | CSR, CBF, DPB, JT |

FIG. 11

| Indicated coordination scheme | Comparison result | Type of feedback information |
|---|---|---|
| CSR | $\Delta Pn > Xcsr$ | Reception level |
| | $Xcsr \geqq \Delta Pn$ | Feedback information unnecessary |
| CBF | $\Delta Pn > Xcsr$ | Reception level |
| | $Xcsr \geqq \Delta Pn > Xcbf$ | Information on beamforming |
| | $Xcbf \geqq \Delta Pn$ | Feedback information unnecessary |
| DPB | – | Feedback information unnecessary |
| JT | $\Delta Pn > Xcsr$ | Reception level |
| | $Xcsr \geqq \Delta Pn > Xcbf$ | Information on beamforming |
| | $Xcbf \geqq \Delta Pn > Xjt$ | Feedback information unnecessary |
| | $Xjt \geqq \Delta Pn$ | Type designated by NDPA |

FIG. 12

| Indicated coordination scheme | Supported coordination scheme | Configuration of threshold for defining operation equivalent to indication of coordination scheme |
|---|---|---|
| CSR | CSR, DPB | Configure Xcbf to be maximum value and Xjt to be minimum value |
| CBF | CSR, CBF, DPB | Configure Xjt to be minimum value |
| DPB | DPB | Configure Xcsr and Xcbf to be maximum value and Xjt to be minimum value |
| JT | CSR, CBF, DPB, JT | No change |

FIG. 14

| Trigger Type subfield value | Trigger frame variant |
|---|---|
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8-15 | Reserved |

FIG. 16

| Trigger Type subfield value | Trigger frame variant |
|---|---|
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8 | Beamforming Report Poll to which the number of NDPs has been added |
| 9-15 | Reserved |

FIG. 17

WIRELESS COMMUNICATION DEVICE AND WIRELESS COMMUNICATION METHOD

TECHNICAL FIELD

The present disclosure relates to a radio communication apparatus and a radio communication method.

BACKGROUND ART

The standardization of technical specification for 802.11be (hereinafter, referred to as "11be") has been in progress as a successor standard for 802.11ax (hereinafter, referred to as "11ax"), which is a standard of the Institute of Electrical and Electronics Engineers (IEEE) 802.11.

In 11be, application of coordinated communication has been discussed, in which a plurality of radio communication control apparatuses on a data transmission side coordinate with each other to transmit data to a radio communication apparatus on a reception side.

CITATION LIST

Non Patent Literature

NPL 1

IEEE 802.11-19/0103r1, AP Coordination in EHT, 2019-03-11

NPL 2

"Heterogeneous Network Capacity Expansion Technologies for Further Development of LTE/LTE-Advanced," NTT DOCOMO Technical Journal, Vol. 21, No. 2, July 2013

NPL 3

IEEE 802.11-19/0448r1, Multi-AP Transmission Procedure, 2019-03-11

NPL 4

IEEE P802.11ax/D4.0, February 2019

SUMMARY OF INVENTION

Feedback information in coordinated communication, however, has not been sufficiently discussed.

One non-limiting and exemplary embodiment of the present disclosure facilitates providing a radio communication apparatus and a radio communication method each enabling appropriate control of a configuration of feedback for a plurality of transmission sources.

A radio communication apparatus according to one example of the present disclosure includes: reception circuitry, which, in operation, receives a plurality of radio signals transmitted by a plurality of transmission sources; and control circuitry, which, in operation, controls a configuration of feedback for the plurality of radio signals in accordance with a difference in reception quality among the plurality of radio signals.

It should be noted that general or specific embodiments may be implemented as a system, an apparatus, a method, an integrated circuit, a computer program, a storage medium, or any selective combination thereof.

According to an exemplary embodiment of the present disclosure, it is made possible to appropriately control a configuration of feedback for a plurality of transmission sources.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 3 is a diagram illustrating examples of feedback information defined in 11ax;

FIG. 9 is a diagram illustrating exemplary types of feedback information corresponding to results of comparison with thresholds;

FIG. 11 is a diagram illustrating an example of a correspondence between indicated coordination schemes and supported coordination schemes;

FIG. 12 is a diagram illustrating examples of selecting feedback information in a case of the correspondence illustrated in FIG. 11;

FIG. 14 is a diagram illustrating examples of changing thresholds;

FIG. 16 is a diagram illustrating examples of Trigger Type subfield values;

FIG. 17 is a diagram illustrating examples of Trigger Type subfield values in the embodiment;

DESCRIPTION OF EMBODIMENTS

Hereinafter, an embodiment of the present disclosure will be described in detail with reference to the accompanying drawings.

One Embodiment

[Coordination Schemes]

In 11be, application of a DL Multi-AP coordination (hereinafter, referred to as "downlink coordinated communication") has been discussed, in which access points (each referred to as "base station," hereinafter, "Access Point (AP))," which are a plurality of radio communication control apparatuses on a signal transmission side, transmit data to a terminal (hereinafter, referred to as "Station (STA)"), which is a radio communication apparatus on a reception side, for example. In 11be, utilization of coordination schemes referred to as follows, for downlink coordinated communication has been discussed: Coordinated Spatial Reuse (hereinafter, referred to as "CSR"), Coordinated Beamforming (hereinafter, referred to as "CBF"), Joint Transmission (hereinafter, referred to as "JT"), and Dynamic point Blanking (hereinafter, referred to as "DPB") (see, e.g., Non Patent Literature (hereinafter, NPL 1). Note that, DPB may be used in conjunction with Dynamic point selection (see, e.g., NPL 2).

Figure 1:
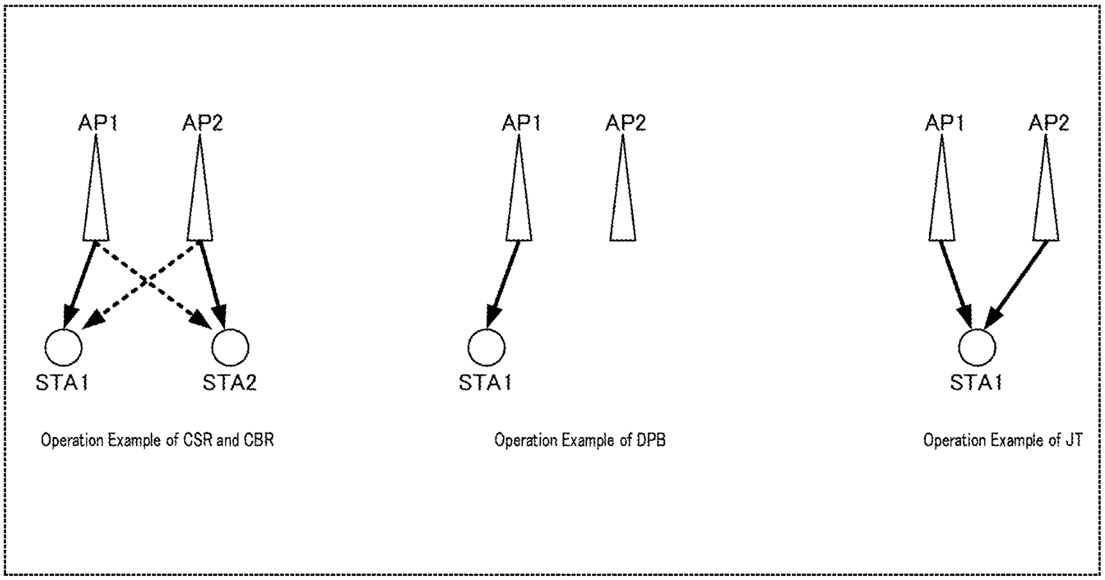
FIG. 1 is a diagram illustrating exemplary coordination schemes.

FIG. 1 is a diagram illustrating exemplary coordination schemes. FIG. 1 illustrates operation examples of two APs (AP1 and AP2) and STAs in a case where CSR or CBF, DPB, and JT, are used. Note that, in the operation examples of FIG. 1, the directions of downlink signals to be transmitted and received at certain times and at certain frequencies are indicated by solid arrows.

In the operation example of CSR or CBF in FIG. 1, AP1 and AP2 transmit downlink (DL) signals to STA1 and STA2 at the same time and at the same frequency, respectively. Further, in the operation example of DPB in FIG. 1, AP1 transmits a downlink signal to STA1. Note that, although illustration is omitted in FIG. 1, AP2 may transmit a downlink signal to STA2 using a frequency different from the frequency used by AP1 to transmit the signal to STA1 in the operation example of DPB. In the operation example of JT in FIG. 1, AP1 and AP2 both transmit downlink signals to STA1 at the same time and at the same frequency.

In CSR or CBF, the downlink signal addressed to STA2 transmitted by AP2 becomes an interference wave to STA1 (e.g., broken line arrow in FIG. 1), and the downlink signal addressed to STA1 transmitted by AP1 becomes an interference wave to STA2. Note that, the interference wave may be referred to as an interference signal. In the case of CSR, AP1 and AP2 control the transmission power such that the interference wave becomes small. In the case of CBF, AP1 and AP2 perform beamforming that directs a beam to STA of the transmission destination (or directs null to STA different from the transmission destination) such that the interference wave becomes small.

In DPB, AP1 and AP2 do not transmit downlink signals, using the same frequency, and thus, no interference is generated.

In JT, AP1 and AP2 transmit downlink signals to STA1, and thus, no interference wave to STA1 is generated, and the downlink signals addressed to STA1 transmitted by AP1 and AP2 respectively increase the gain with each other.

In downlink coordinated communication using the above-described coordination schemes, reception of a signal (e.g., known signal) from an AP by an STA and transmission of information on reception quality of the received signal from the STA to the AP has been discussed. Hereinafter, the information on the reception quality to be transmitted by the STA is referred to as "feedback information."

In downlink coordinated communication of 11be, a method has been proposed, in which feedback information for a plurality of APs is transmitted from an STA by extending a function of transmitting feedback information from the STA to the AP of a transmission source of the known signal as defined in 11ax (see, e.g., NPL 3).

The term "feedback information for an AP" herein indicates information on reception quality of the received signal determined by receiving the signal (e.g., known signal) from the AP by the STA. The term "feedback information for AP1 and AP2" indicates information on reception quality of each signal determined by receiving signals respectively from AP1 and AP2 by the STA. The term "feedback information for a plurality of APs" indicates information on reception quality of each of the received signals, determined by receiving signals respectively from the plurality of APs by an STA.

Figure 2:
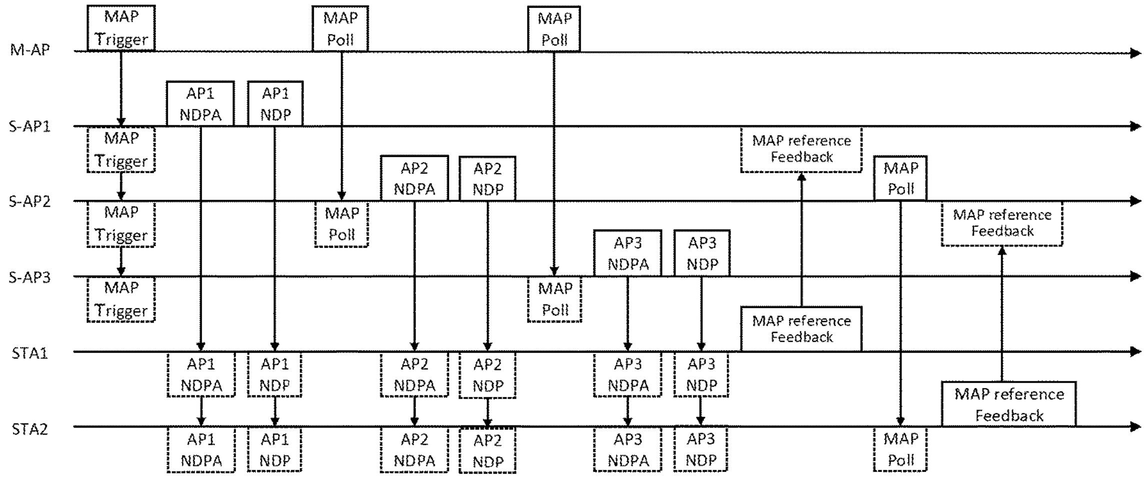
FIG. 2 is a diagram illustrating an exemplary sequence of transmission and reception of signals.

FIG. 2 illustrates an exemplary sequence of transmission and reception of signals. FIG. 2 illustrates an example in which STA1 and STA2 transmit feedback information for S-AP1, S-AP2, and S-AP3. Note that, S-AP1, S-AP2 and S-AP3 are examples of three slave APs (Slave-AP (S-AP) that coordinate with each other under the control of a master AP (Master-AP (M-AP). In FIG. 2, S-AP1 is the AP that has established radio connection with STA1 and corresponds to an association AP of STA1. Further, in FIG. 2, S-AP2 corresponds to an association AP of STA2.

M-AP transmits a sounding processing start trigger for downlink coordinated communication (e.g., Multi-AP (MAP) Trigger) in FIG. 2 to S-AP1, S-AP2 and S-AP3. S-AP1 transmits packets including feedback control information (e.g., AP1 null data packet Announcement (NDPA) in FIG. 2) and packets including a known signal (e.g., AP1 null data packet (NDP) in FIG. 2) to STA1 and STA2. Note that, the feedback control information indicates the type and granularity of information to be transmitted as feedback from the STA to the AP. Further, known signals are each referred to as "Long Training field (LTF)" in 11ax, for example.

M-AP transmits an NDPA transmission start trigger (e.g., MAP Poll in FIG. 2) to S-AP2. S-AP2 transmits NDPA (AP2 NDPAs in FIG. 2) and NDP (AP2 NDP in FIG. 2) to STA1 and STA2. M-AP transmits a MAP Poll to S-AP3. S-AP3 transmits an NDPA (AP3 NDPA in FIG. 2) and NDP (AP3 NDPA in FIG. 2) to STA1 and STA2. STA1 generates feedback information for each of the APs based on known signals (e.g., LTFs included in NDPs) received from S-AP1, S-AP2 and S-AP3. STA1 transmits information (e.g., Multi-AP (MAP) reference feedback) in FIG. 2) including feedback information for each of the APs to an association AP (e.g., S-AP1 in FIG. 2). STA2 receives a MAP Poll from the association AP (e.g., S-AP2 in FIG. 2). STA2 transmits MAP reference feedback to S-AP2. Note that, in FIG. 2, STA1 transmits MAP reference feedback after receiving AP3 NDPA and AP3 NDP, while STA2 transmits MAP reference feedback after receiving a MAP Poll. In other words, a reception packet that triggers the transmission of MAP reference feedback is different for STAs. The transmission timing of MAP reference feedback (e.g., reception packet serving as trigger for transmission of MAP reference feedback) may be indicated by an NDPA, for example.

Next, a description will be given of examples of feedback information from STAs to APs illustrated in the example in FIG. 2.

FIG. 3 is a diagram illustrating examples of feedback information defined in 11ax. In FIG. 3, feedback information illustrated in Table 9-93b in NPL 4 is illustrated in a table format.

The term "Average SNR of Space-Time Stream X (X=1 to Nc)" in FIG. 3 is information indicating Signal to Noise Ratio (SNR) (hereinafter, referred to as "SNR information"). "Average SNR of Space-Time Stream X (X=1–Nc)" represents a range from −10 dB to 53.75 dB in steps of 0.25 dB, for example. The term "Compressed beamforming feedback matrix V for subcarrier k=scidx (Y) (Y=0 to Ns−1)" is matrix information for performing beamforming.

The information to be transmitted as feedback in the information illustrated in FIG. 3 may be designated by feedback control information included in NDPA. Further, the term "Compressed beamforming feedback matrix V for subcarrier k=scidx(Y) (Y=0 to Ns−1)" may be quantized according to the granularity (e.g., the number of bits) designated in the feedback control information included in NDPA.

As described above, in downlink coordinated communication in 11be, transmission of feedback information for a plurality of APs from an STA is discussed. In a case where pieces of the information on a single AP indicated as examples in FIG. 3 are included in the feedback information, the information amount of feedback information for a plurality of APs possibly increases.

In this respect, one non-limiting and exemplary embodiment of the present disclosure describes methods for appropriately indicating feedback information in downlink coordinated communication by reducing the information amount of the feedback information.

[Configuration of Radio Communication System]

A radio communication system according to an embodiment of the present disclosure includes at least two transmission source APs and one STA. In the following description, for example, the term "radio communication control apparatus" corresponds to an AP and the "radio communication apparatus" corresponds to an STA.

Figure 4:
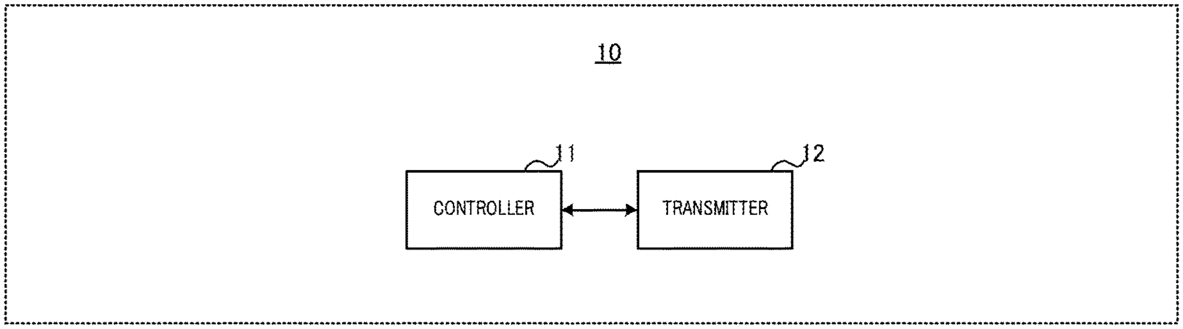
FIG. 4 is a block diagram illustrating a configuration example of a part of a radio communication control apparatus.

FIG. 4 is a block diagram illustrating a configuration example of a part of radio communication control apparatus 10. Radio communication control apparatus 10 illustrated in FIG. 4 includes controller 11 and transmitter 12.

Controller 11 generates signals including a known signal. Transmitter 12 transmits radio signals including a known signal.

Figure 5:
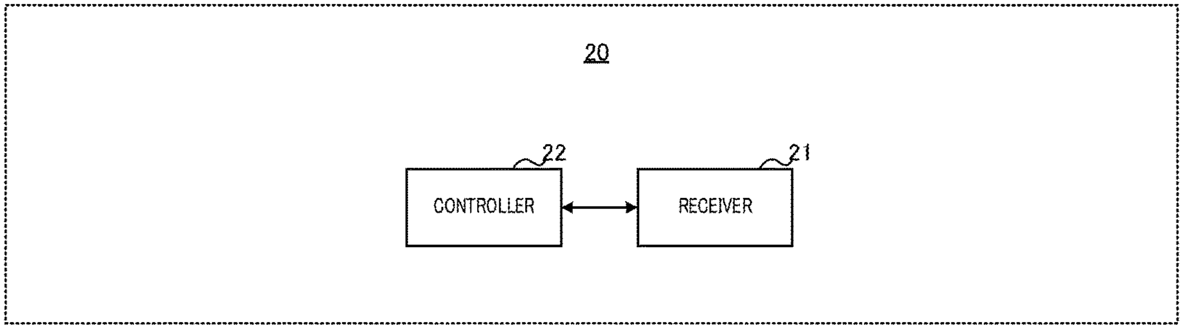
FIG. 5 is a block diagram illustrating a configuration example of a part of a radio communication apparatus.

FIG. 5 is a block diagram illustrating a configuration example of a part of radio communication apparatus 20. Radio communication apparatus 20 illustrated in FIG. 5 includes receiver 21 and controller 22.

Receiver 21 receives a plurality of radio signals from a plurality of transmission sources (e.g., radio communication control apparatuses 10).

Controller 22 controls a configuration of feedback for the plurality of radio signals in accordance with a difference in reception quality among the plurality of radio signals.

Hereinafter, as an example, a case in which downlink coordinated communication is performed based on transmission of feedback information for downlink communication in 11ax will be described.

Figure 6:
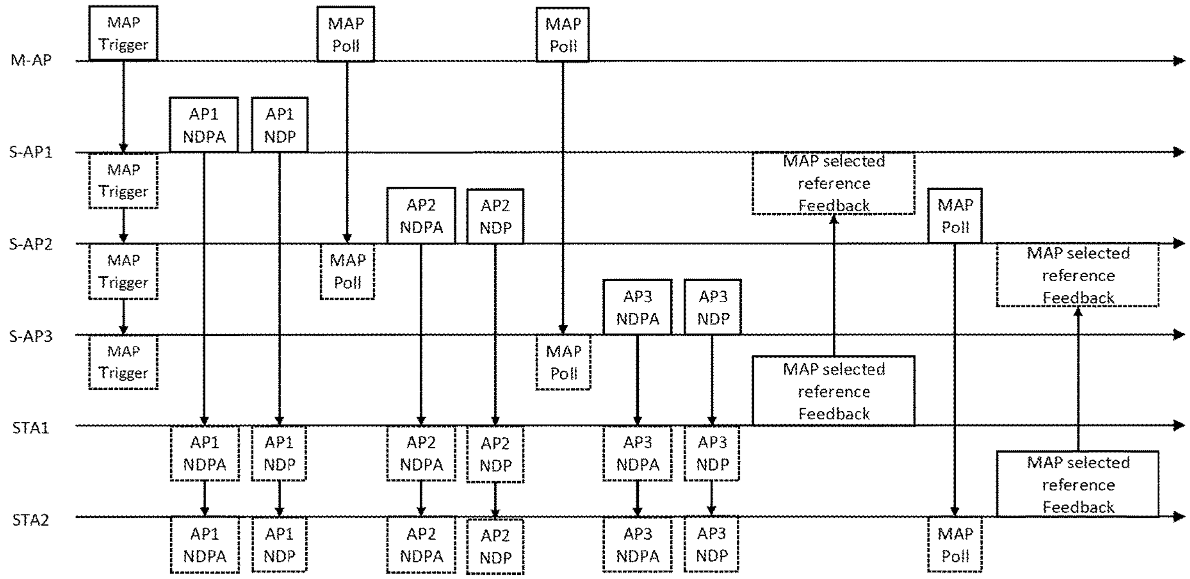
FIG. 6 is a diagram illustrating an exemplary sequence of transmission and reception of signals according to an embodiment.

FIG. 6 is a diagram illustrating an exemplary sequence of transmission and reception of signals according to the present embodiment. In FIG. 6, an example is illustrated in which STA1 and STA2 transmit feedback information for S-AP1, S-AP2 and S-AP3 as in FIG. 2. Note that, the descriptions of the same parts as those in FIG. 2 are omitted in FIG. 6.

In FIG. 6, the processing from MAP Trigger transmission to AP3 NDP transmission is the same as that illustrated in FIG. 2; thus, the description thereof is omitted.

STA1 selects types of feedback information based on known signals included in the NDPs received from S-AP1, S-AP2, and S-AP3. STA1 generates feedback information for S-AP1, S-AP2, and S-AP3, including the selected types and transmits information including the feedback information for S-AP1, S-AP2, and S-AP3 (e.g., Multi-AP (MAP) selected reference feedback in FIG. 6) to an association AP (e.g., S-AP1 in FIG. 6). Note that, an example of selecting types of feedback information will be described, hereinafter.

S-AP2 (e.g., association-AP of STA2 in FIG. 6) transmits a MAP Poll to STA2. As with STA1, STA2 selects types of feedback information for S-AP1, S-AP2, and S-AP3 based on the known signals received from S-AP1, S-AP2 and S-AP3. STA2 generates feedback information for S-AP1, S-AP2 and S-AP3, including the selected types and transmits information including the feedback information for S-AP1, S-AP2 and S-AP3 (e.g., MAP selected reference feedback in FIG. 6) to an association AP (e.g., S-AP2 in FIG. 6).

Note that, the MAP Poll transmitted from S-AP2 to STA2 illustrated in FIG. 6 may be Beamforming Report Poll (BFRP) Trigger in 11ax. Further, a MAP Poll or BFRP Trigger may be transmitted from S-AP1 to STA1 after AP3 NDP transmitted from S-AP3 to STA1 (e.g., see Section 26.7.3 in NPL 4).

[Configuration of Radio Communication Control Apparatus]

Figure 7:
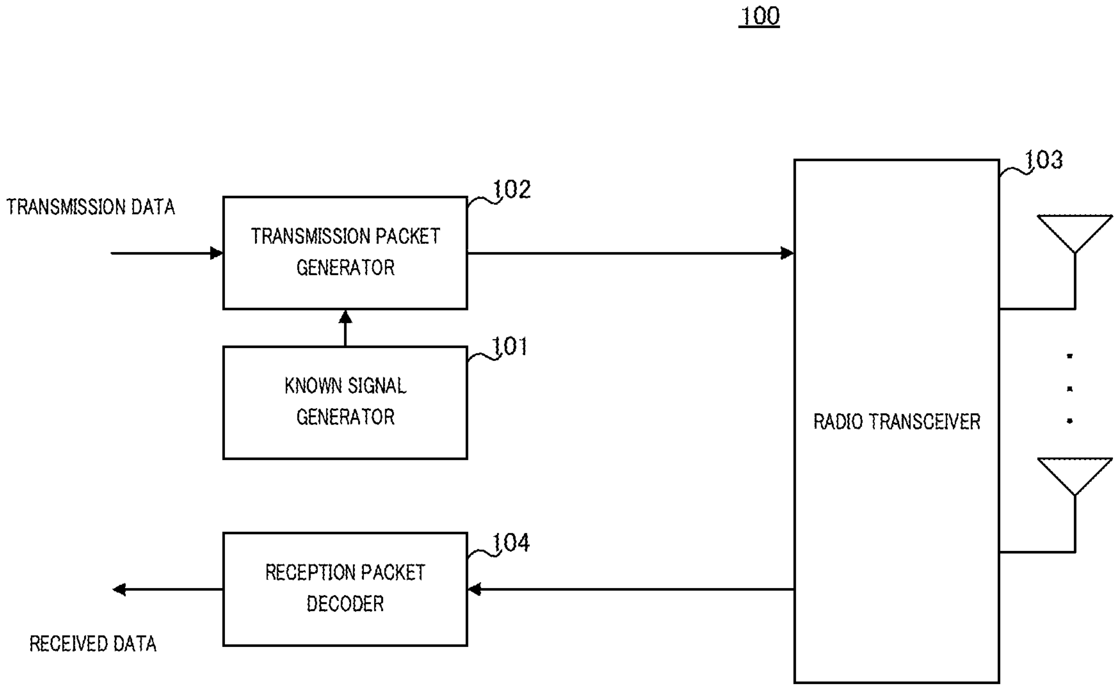
FIG. 7 is a block diagram illustrating a configuration example of an AP according to the embodiment.

FIG. 7 is a block diagram illustrating a configuration example of radio communication control apparatus 100 according to the present embodiment. In FIG. 7, radio communication control apparatus 100 includes known signal generator 101, transmission packet generator 102, radio transceiver 103, and reception packet decoder 104.

Radio communication control apparatus 100 illustrated in FIG. 7 corresponds to an example of communication control apparatus 10 illustrated in FIG. 4. Further, radio transceiver 103 in FIG. 7 may correspond to an example of transmitter 12 in FIG. 4, and known signal generator 101 and transmission packet generator 102 in FIG. 7 may correspond to an example of controller 11 in FIG. 4.

Known signal generator 101 generates a known signal. The known signal may be referred to as Long Training field (LTF) in 11ax, for example.

Transmission packet generator 102 generates a transmission packet based on the known signal generated by known signal generator 101 and on transmission data. The generated transmission packet includes at least one of a MAP Trigger, NDPA, NDP, and MAP Poll illustrated in FIG. 6, for example.

Radio transceiver 103 performs a predetermined radio transmission process on the transmission packet to convert the packet into a radio transmission signal. Radio transceiver 103 transmits a radio transmission signal from an antenna.

Radio transceiver 103 receives a radio reception signal from an antenna. Radio transceiver 103 performs a predetermined radio reception process on the received radio transmission and reception signal to generate a reception packet. The reception packet may include at least one of a MAP Trigger, MAP Poll, and MAP selected reference feedback illustrated in FIG. 6, for example.

Reception packet decoder 104 decodes the reception packet and generates the received data.

[Configuration of Radio Communication Apparatus]

Figure 8:
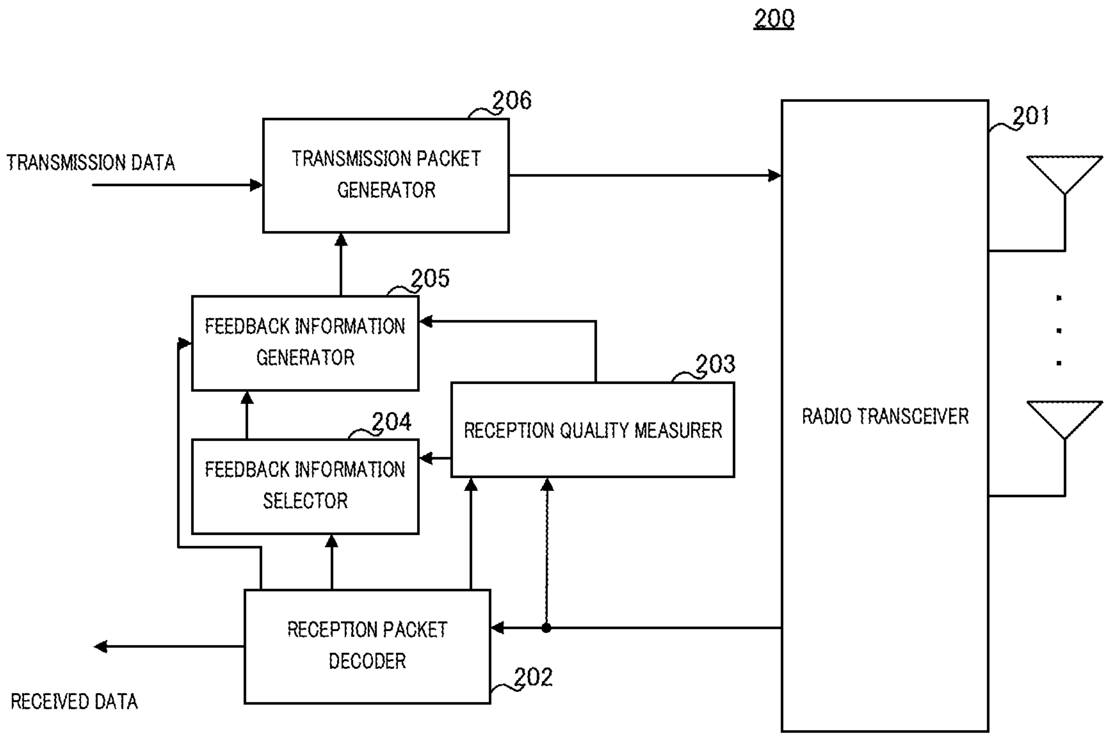
FIG. 8 is a block diagram illustrating a configuration example of an STA according to the embodiment.

FIG. 8 is a block diagram illustrating a configuration example of radio communication apparatus 200 according to the present embodiment. In FIG. 8, radio communication apparatus 200 includes radio transceiver 201, reception packet decoder 202, reception quality measurer 203, feedback information selector 204, feedback information generator 205, and transmission packet generator 206.

Radio communication apparatus 200 illustrated in FIG. 8 corresponds to an example of radio communication apparatus 20 illustrated in FIG. 5. Further, radio transceiver 201 in FIG. 8 may correspond to an example of receiver 21 in FIG.

5, and reception quality measurer 203 and feedback information selector 204 in FIG. 8 may correspond to an example of controller 22 in FIG. 5.

Radio transceiver 201 receives a radio reception signal from an antenna. Radio transceiver 201 performs a predetermined radio reception process on the received radio transmission and reception signal to generate a reception packet. The reception packet may include at least one of an NDPA, NDP, and MAP Poll, for example.

Reception packet decoder 202 decodes the reception packet and generates the received data.

Reception quality measurer 203 measures reception quality from a known signal included in an NDP in a case where the NDP is included in the reception packet. Reception quality measurer 203 indicates the measured reception quality to feedback information selector 204 and feedback information generator 205. Note that reception quality to be indicated may be associated with an AP of the transmission source of the NDP subject to a reception quality measurement.

Feedback information selector 204 and feedback information generator 205 save the indicated reception quality. When receiving a plurality of indications from reception quality measurer 203, feedback information selector 204 and feedback information generator 205 save the plurality of indicated pieces of reception quality.

Feedback information selector 204 controls a configuration of feedback based on the reception quality acquired from reception quality measurer 203. The control of the configuration of feedback includes selecting a type of feedback information, for example. The control of the configuration of feedback may further include selecting whether or not to transmit feedback information. Further, the control of the configuration of feedback may further include control of a configuration of a transmission destination of the feedback information and/or configuration of a configuration of the feedback information.

In a case where feedback information selector 204 receives a reception packet serving as a trigger, for example, (e.g., cases where STA1 receives AP3 NDP and STA2 receives MAP Poll in the example of FIG. 6), feedback information selector 204 selects a type of feedback information based on reception quality. Feedback information selector 204 then indicates the selected type to feedback information generator 205. Further, feedback information selector 204 may indicate configuration information on the transmission destination of the feedback information and the configuration of the feedback information to feedback information generator 205

The type selected by feedback information selector 204 herein may be different from the type designated by the feedback control information included in an NDPA.

In the example in FIG. 6, in cases where STA1 receives an AP3 NDP and STA2 receives a MAP Poll, feedback information generator 205 generates feedback information for S-AP1, S-AP2, and S-AP3 based on the types indicated from feedback information selector 204. Note that, feedback information generator 205 may configure a transmission destination and/or a configuration of the feedback information based on the configuration information indicated by feedback information selector 204.

Transmission packet generator 206 generates a transmission packet (e.g., MAP selected reference feedback in FIG. 6) including the feedback information for S-AP1, S-AP2, and S-AP3 generated by feedback information generator 205.

Radio transceiver 201 performs a predetermined radio transmission process on the transmission packet to convert the transmission packet into a radio transmission signal. Radio transceiver 201 transmits the radio transmission signal from an antenna.

[Examples of Selecting Types of Feedback Information]

In coordinated communication in which a plurality of APs coordinate with each other to communicate with an STA, the effective coordination scheme differs in accordance with a difference in reception quality of signals received by the STA from the plurality of APs, respectively. The reception quality of the received signals herein may be, for example, a reception level (e.g., received power) and/or may be information on another reception quality.

Hereinafter, an example of the relationship between reception level differences and coordination schemes will be described using the example in FIG. 1. Note that, in the example in FIG. 1, a reception level difference in STA1 corresponds to a difference between a reception level of the signal received by STA1 from AP1 (hereinafter, the "reception level for AP1") and a reception level of the signal received by STA1 from AP2 (hereinafter, the "reception level for AP2"). Hereinafter, an example will be described in which the reception level difference is a value resulting from subtracting the reception level for AP2 from the reception level for AP1.

In FIG. 1, in CSR or CBF, a downlink signal from AP2 to STA2 becomes an interference wave to STA1, so that CSR or CBF is effective when the reception level for AP2 is sufficiently lower than the reception level for AP1 in STA1 (e.g., when the reception level difference is greater than a certain threshold). In addition, for CSR and CBF, each AP performs beamforming in CBF, so that the effect of reducing the interference wave is high as compared with CSR. In other words, since CSR is less effective in reducing the interference wave than CBF, it is desirable that the reception level difference is greater than that of CBF.

Further, AP1 and AP2 transmit downlink signals to STA1 in JT, so that it is more effective when the reception level difference in STA1 is relatively small, than when the reception level difference is relatively large.

As described above, the effective coordination scheme differs in accordance with a reception level difference. In the relationship between the reception level differences and the coordination schemes, the coordination schemes may be more effective in order of CSR, CBF, DPB, and JT for larger reception level differences.

Further, the information used in each coordination system is different, so that the appropriate feedback information is different in each coordination system.

For CSR, the reception level of an interference wave is used for transmission power control and Modulation and Coding Scheme (MCS) selection in transmission of a downlink signal, for example. For this reason, feedback information for an AP of the transmission source of the signal serving as an interference wave, includes information on the reception level. The AP of the transmission source of the signal serving as an interference wave herein corresponds to AP2 in STA1 in the example in FIG. 1, for example. Further, the information on the reception level corresponds to SNR information in FIG. 3, for example.

For CBF, an AP of the transmission source of the signal serving as an interference wave (e.g., AP2 in FIG. 1) performs beamforming (forming a directivity beam) that directs null to an STA that may be given interference (e.g., STA1 in FIG. 1). For this reason, feedback information for the AP of the transmission source of the signal serving as an interference wave includes information in order for the AP of the transmission source of the signal serving as an interference wave to perform beamforming. The information in order for an AP to perform beamforming corresponds to SNR information and matrix information in FIG. 3, for example. Hereinafter, the information for APs to perform beamforming may be described as information on beamforming.

For DPB and JT, feedback information for APs other than the AP that becomes the transmission source is not required. While there is one AP serving as a transmission source in DPB, there are a plurality of APs each serving as a transmission source in JT, however. Thus, feedback information for a plurality of APs is desired in JT.

As described above, the effective coordination scheme differs in accordance with a reception level difference, and feedback information desired in a coordination scheme also differs; thus, the appropriate (or effective) feedback information may be different in accordance with a reception level difference. Hereinafter, an exemplary correspondence between reception level differences and feedback information types will be described.

In the example in FIG. 6, for example, a description will be given of an operation example of feedback information selector 204 when the relationship among the respective reception levels of S-APs in STA1 is "reception level for S-AP1">"reception level for S-AP2">"reception level for S-AP3."

Feedback information selector 204 configures S-AP1 with the highest reception level among the respective saved reception levels for S-AP1, S-AP2, and S-AP3 to be a reference transmission source. Feedback information selector 204 calculates a reception level difference ΔP2 between S-AP1 and S-AP2 and a reception level difference ΔP3 between S-AP1 and S-AP3 by ΔPn (n=2, 3)="reception level for S-AP1"—"reception level for S-ΔPn."

Feedback information selector 204 controls a configuration of feedback by comparing the thresholds Xcsr, Xcbf and Xjt with ΔPn. Feedback information selector 204 selects the type of feedback information for S-AP2 and the type of feedback information for S-AP3, for example.

FIG. 9 is a diagram illustrating exemplary types of feedback information corresponding to the results of comparison with the threshold values. FIG. 9 illustrates the types of feedback information for ΔPn corresponding to the results of comparison between the thresholds, and reception level differences ΔPn between the reference transmission source (S-AP1 in the example described above) and ΔPn (n=2, 3 in the example described above). Feedback information selector 204 selects the types of feedback information for ΔPn based on the example in FIG. 9, for example.

Xcsr is defined based on the reception level difference with which CSR becomes effective. In a case where reception level difference ΔP2 between S-AP1 and S-AP2 is greater than Xcsr, for example, CSR is effective in the coordination scheme used by S-AP1 and S-AP2.

Xcbf is defined based on the reception level difference with which the CBF becomes effective. In a case where reception level difference ΔP2 between S-AP1 and S-AP2 is greater than Xcbf, for example, CBF is effective in the coordination scheme used by S-AP1 and S-AP2.

Xjt is defined based on the reception level difference with which JT becomes effective. In a case where reception level difference ΔP2 between S-AP1 and S-AP2 is not greater than Xjt, for example, JT is effective in the coordination scheme used by S-AP1 and S-AP2.

Note that, as described above, CSR or CBF is more effective when the reception level difference is relatively large, and therefore, CSR or CBF is effective when the reception level difference is larger than the threshold (Xcsr or Xcbf). Meanwhile, since JT is more effective when the reception level difference is relatively small, JT is effective when the reception level difference is smaller than the threshold (Xjt). Further, Xcsr may be larger than Xcbf because CSR is favorable when the reception level is large compared with CBF. The three thresholds may have a relationship of Xcsr>Xcbf>Xjt because of the difference in reception level differences with which the coordination schemes become effective.

In the example in FIG. 9, selection of the type of feedback information for ΔPn is made as a reception level when "ΔPn>Xcsr" is true. The reception level is an example of feedback information corresponding to CSR. Further, selection of the type of feedback information for ΔPn is made as information on beamforming when "Xcsr>ΔPn>Xcbf" is true. The information on beamforming is an example of feedback information corresponding to CBF. Further, selection of the type of feedback information is made that no feedback information for ΔPn is necessary when "Xcbf>ΔPn>Xjt" is true. The selection of this feedback information unnecessary may be considered as an example of feedback information corresponding to DPB. Further, when "Xjt>ΔPn" is true, selection is made that the feedback information for ΔPn is the type designated by NDPA. The feedback information of the type designated in NDPA is an example of feedback information corresponding to JT.

Note that, when a plurality of APs different from the reference transmission source are present, a determination of reception level differences among the APs and a comparison between the reception level differences with thresholds may be made and the types of feedback information for the respective APs may be selected.

The "reception level" illustrated in FIG. 9 may be SNR information illustrated in FIG. 3. Further, the Information on beamforming illustrated in FIG. 9 may be SNR information and matrix information illustrated in FIG. 3.

Note that, feedback information for the reference transmission source (S-AP1 in the above-described example) may be the type designated by NDPA illustrated in FIG. 9.

Further, when "ΔPn>Xcsr" and "Xcsr>ΔPn>Xcbf" are true, the larger the reception level difference (the smaller the reception level for interference) is, the smaller the impact of the interference wave on the reception process is. Therefore, when the reception level difference is large, the information amount of feedback information may be reduced.

The method of reducing the information amount is not particularly limited. In a case where feedback information includes SNR information, for example, the information amount may be reduced by increasing the steps of SNR information illustrated in FIG. 3. Further, in a case where feedback information includes matrix information, for example, the information amount may be reduced by reducing the number of quantization bits of matrix information.

Further, when the configuration of feedback corresponds to CSR (e.g., when "ΔPn>Xcsr" is true), the feedback information may be information for the respective reception levels of a plurality of blocks (e.g., a plurality of subcarriers) resulting from division of a frequency domain. As a result, APs can determine a subcarrier with which CSR becomes more effective. Further, even in a case where the reception level varies to a large extent in subcarriers, appropriate selection of MCS and transmission power control are possible, and thus, throughput is enhanced.

According to the above-described selection, feedback information can be reduced by selecting feedback information adapted to the situation, and the system-improving effects by downlink coordinated communication can be enhanced.

In the above-described example, an example has been described in which the AP with the highest reception level is configured to be a reference transmission source, but an association AP may be configured to be a reference transmission source. Thus, an AP of the transmission source in data communication of CSR, CBF, and DPB can be an association AP. Further, the AP with the highest reception level is the reference transmission source, and may be an association AP.

The reference transmission source may be designated by an AP. APs may designate, via an indication to an STA, whether the STA configures the reference transmission source to be an AP with the highest reception level or to be an association AP, for example. The indication for designating the reference transmission source may be included in broadcast information (beacons) periodically transmitted by an AP or may be included in an NDPA or MAP Poll illustrated in FIG. 6.

Next, an example of selection processing of types of feedback information in the present embodiment will be described.

Figure 10:
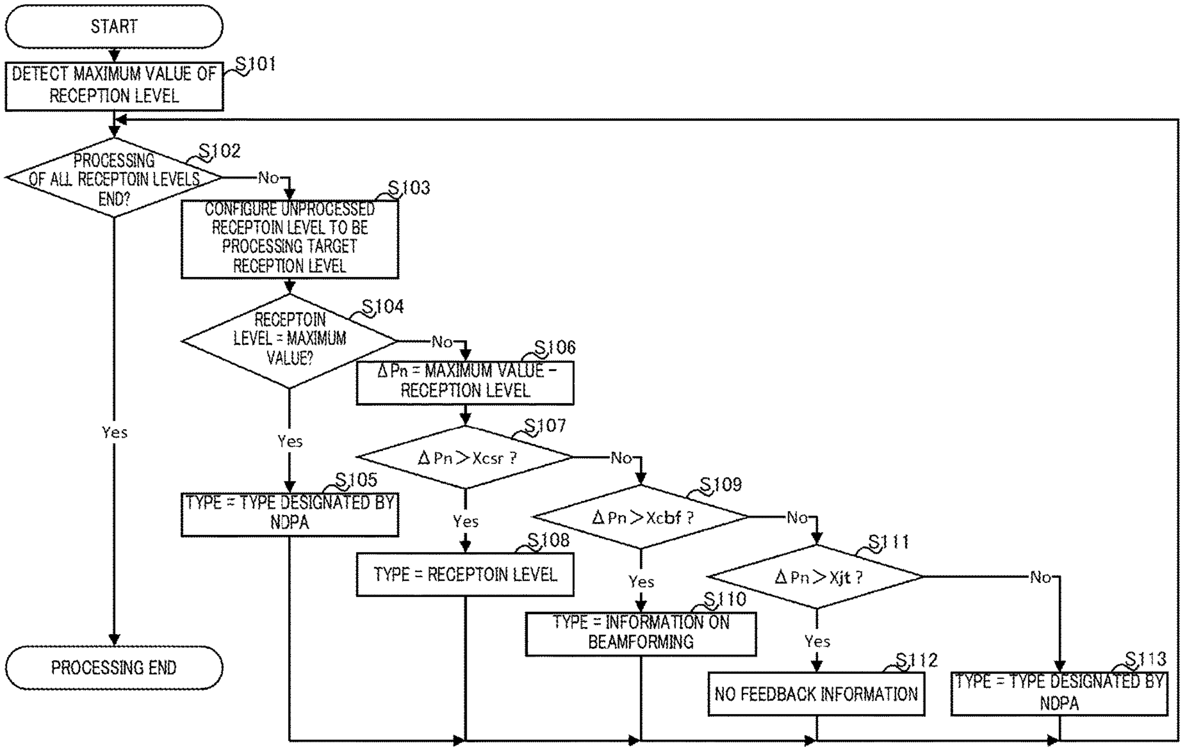
FIG. 10 is a flowchart illustrating an example of selection processing of a type of feedback information in the embodiment.

FIG. 10 is a flowchart illustrating an example of selection processing of types of feedback information in the present embodiment. The flow illustrated in FIG. 10 is performed after reception of known signals from a plurality of APs by STAs, for example. The flow illustrated in FIG. 10 is performed after reception of AP3 NDP by STA1 and STA2 in FIG. 6, for example.

An STA detects the maximum value of a reception level among reception levels of the received known signals (S101).

The STA determines whether or not the process of selecting types of feedback information for all of the reception levels of the received known signals has been completed (S102).

In a case where the process has been completed (Yes in S102), in other words, in a case where an unprocessed reception level is absent, the STA terminates the process of selecting types of feedback information.

In a case where the process has not been completed (No in S102), in other words, in a case where an unprocessed reception level is present, the STA configures one of unprocessed reception levels to be a processing target reception level (S103). Note that, each reception level may be associated with a transmission source of a known signal corresponding to the reception level. Hereinafter, the transmission source of a known signal corresponding to a reception level may be abbreviated as "reception-level transmission source."

The STA determines whether the processing target reception level is the maximum value (S104). The maximum value herein is the value detected in S101.

When the processing target reception level is the maximum value (Yes in S104), the STA selects "type designated by NDPA" for the type of feedback information (S105). Then, the flow shifts to S102.

When the processing target reception level is not the maximum value (No in S104), the STA configures a value resulting from division of the processing target reception level from the maximum value of the reception level to be reception level difference ΔPn (S106). The term "n" herein may be an index attached to the transmission source of the processing target reception level.

The STA determines whether "ΔPn>Xcsr" is true (S107).

When "ΔPn>Xcsr" is true (Yes in S107), the STA selects "reception level" for the type of feedback information (S108). The flow then returns to S102.

When "ΔPn>Xcsr" is not true (No in S107), the STA determines whether "ΔPn>Xcbf" is true (S109).

When "ΔPn>Xcbf" is true (Yes in S109), the STA selects "information on beamforming" for the type of feedback information (S110). The flow then returns to S102.

When "ΔPn>Xcbf" is not true (No in S109), the STA determines whether "ΔPn>Xjt" is true (S111).

When "ΔPn>Xjt" is true (YES in S111), the STA selects no feedback information (S112). The flow then returns to S102.

When "ΔPn>Xjt" is not true (No in S111), that is, when "Xjt>ΔPn" is true, the STA selects "type designated by NDPA" for the type of feedback information (S113). The flow then returns to S102.

According to the flow described above, STAs select the type of feedback information for each AP and generate feedback information of the selected type.

As described above, for selection of the types of feedback information, results of comparison between predetermined thresholds and differences in reception quality (e.g., reception level differences) may be used. Accordingly, appropriate feedback information adapted to the situation of the communication environment and/or the like can be indicated. Further, this makes it possible to reduce feedback information and thus enhances the system-improving effects by downlink coordinated communication.

[Variation 1 of Selecting Types of Feedback Information]

In the example described above, an example has been described in which effective feedback information is selected for four coordination schemes (CSR, CBF, DPB, and JT), but the present disclosure is not limited to this example. The number of target coordination schemes may be five or more, or three or less. A coordination scheme that differs from for example, CSR, CBF, DPB, and JT may be included in the target coordination schemes, or any of CSR, CBF, DPB, and JT may be excluded from the target coordination schemes, for example.

Some of the four coordination schemes described above may not be supported depending on APs, for example. In this case, an STA may select effective feedback information by indication of the supported coordination schemes from the AP.

APs may indicate information indicating at least one coordination scheme among the supported coordination schemes (e.g., supported coordination schemes or operable coordination schemes), for example. In this case, STAs may determine the coordination scheme supported by the AP, based on the indicated coordination scheme. Alternatively, STAs may change the selection processing of types of feedback information based on the indicated coordination scheme.

FIG. 11 is a diagram illustrating an example of the correspondence between the indicated coordination schemes and the supported coordination schemes.

In the example in FIG. 11, for example, when the indicated coordination scheme is JT, the AP that has made the indication can operate in CSR, CBF, DPB, and JT. Further, in the example in FIG. 11, when the indicated coordination scheme is CBF, the AP that has made the indication can operate in CSR, CBF, and DPB. Further, in the example in FIG. 11, when the indicated coordination scheme is CSR, the AP that has made the indication can operate in CSR and DPB.

Note that, the coordination scheme DPB may be considered as operable with all the indications because no feedback information other than the reference transmission source is required.

FIG. 12 is a diagram illustrating an example of selecting feedback information in the case of the correspondence illustrated in FIG. 11.

When the indicated coordination scheme is CSR, since APs support neither CBF nor JT, the STA compares Xcsr and ΔPn and determines the type of feedback information without making comparisons between Xcbf and ΔPn and between Xjt and ΔPn.

When the indicated coordination scheme is CBF, since APs do not support JT, the STA compares Xcbf and ΔPn and compares Xcsr and ΔPn and determines the type of feedback information without making any comparison between Xjt and ΔPn.

When the indicated coordination scheme is DPB, since APs support none of CSR, CBR, and JT, the STA makes no comparisons between Xcbf and ΔPn, between Xjt and ΔPn, and between Xcsr and ΔPn, and determines that feedback information is not necessary.

When the indicated coordination scheme is JT, since APs support the four coordination schemes, as with FIG. 9, comparisons between the three thresholds and ΔPn are made, and the type of feedback information is determined.

Indicating the coordination scheme allows selection of appropriate types of feedback information based on the reception quality (e.g., reception levels) and the coordination scheme(s) supported by APs.

Note that, in JT, an STA simultaneously receives transmission signals from a plurality of APs each serving as a transmission source, so that synchronization is established between APs coordinating with each other.

Figure 13:
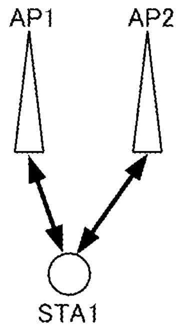
FIG. 13 is a diagram illustrating an example of establishing synchronization between APs.

FIG. 13 is a diagram illustrating an example of synchronization establishment between APs.

In FIG. 13, in order to establish synchronization between AP1 and AP2, transmission and reception signals of STA1 communicable with AP1 and AP2 are used. In this synchronization method, no synchronization is established when an STA communicable with a plurality of APs subject to synchronization is absent.

In a case where JT is supported but synchronization between APs cannot be established, APs may select CBF for the coordination scheme to be indicated. Thus, when no synchronization can be established, a comparison to find whether "Xjt>ΔPn" is true and selection of the types corresponding to the case where "Xjt>ΔPn" is true are not performed. Thus, feedback information more appropriate to the situation can be selected.

Note that, the indication information for the coordination scheme(s) from APs may be included in broadcast information (beacons) periodically transmitted form an AP or in an NDPA or MAP Poll illustrated in FIG. 6.

Further, instead of indicating the coordination scheme(s) from APs, an STA may change a value of at least some of the thresholds Xcsr, Xcbf, and Xjt. The information indicating, for example, a changed threshold may be indicated to the STA from the AP.

FIG. 14 is a diagram illustrating an example of changing the thresholds. In FIG. 14, examples of thresholds defining operations equivalent to the indication corresponding to the coordination schemes to be indicated as illustrated in FIG. 12.

The configuration of thresholds that supports the operation equivalent to the case where the coordination scheme to be indicated is CSR may be a configuration to change Xcbf to the maximum value and to change Xjt to the minimum value. Note that, the maximum value herein may be the largest value among the values ΔPn possibly takes or may be a value sufficiently larger than the values ΔPn possibly takes. Further, the minimum value may be the smallest value among the values ΔPn possibly takes or may be a value sufficiently smaller than the values ΔPn possibly takes.

In this case, since Xcbf is changed to the maximum value, for example, the condition "Xcsr>ΔPn>Xcbf" in FIG. 9 does not stand true with any value of ΔPn. Further, since Xjt is changed to the minimum value, for example, the condition "Xjt>ΔPn" in FIG. 9 does not stand true with any value of ΔPn. The fact that these conditions do not stand true is equivalent to the case where neither "information on beamforming" nor "type designated by NDPA" as illustrated in FIG. 9 is selected, and therefore, the operation equivalent to the case where the coordination scheme to be indicated is CSR is defined.

In a case where downlink coordinated communication is performed using, for example, CSR and/or CBF, the system throughput is enhanced while the user throughput of an STA to be a coordination target is reduced. Further, in a case where downlink coordinated communication is performed using, for example, JT, the user throughput of an STA serving as a reception source of a downlink signal is enhanced while the system throughput is reduced. Therefore, in order to enhance the system throughput, the values of the three thresholds may be adjusted to make it easier to apply CSR and/or CBF to the coordination scheme. Adjusting Xcsr, Xcbf, and Xjt to have smaller values, for example, the possibility of making the conditions "ΔPn>Xcsr" and "Xcsr>ΔPn>Xcbf" stand true is enhanced while the possibility of making the condition "Xjt>ΔPn" stand true is reduced.

Further, in a case where the user throughput is to be increased, for example, the three threshold values may be adjusted to make it easier to apply JIT to the coordination scheme. Adjusting Xcsr, Xcbf, and Xjt to have large values, for example, the possibility of making the conditions "ΔPn>Xcsr" and "Xcsr≥ΔPn>Xcbf" stand true is reduced while the possibility of making the condition "Xjt>ΔPn" stand true is enhanced.

The thresholds may be adjusted by an AP, and an adjusted threshold may be indicated from the AP to an STA. This makes it possible to select an appropriate type of feedback information.

Note that, Xcsr, Xcbf, and Xjt may be included in broadcast information (beacons) periodically transmitted by an AP or in an NDPA or MAP Poll illustrated in FIG. 6.

In Variation1 described above, an example has been described in which a candidate for a selection target for feedback information is limited by information indicated form an AR The information indicated from APs may be information on the coordination scheme(s) supported by the APs, for example. In this case, the information to be indicated may be changed depending on the synchronization state of a plurality of APs coordinating with each other.

[Example of Indication on Selecting Types of Feedback Information]

In a case where NDPs are transmitted from a plurality of APs to an STA, for example, the APs may indicate, to the STA, information for checking completion of transmission of the NDPs (information used for STA to determine completion of reception of NDPs). The information for checking completion of transmission of NDPs may be, for example, information indicating the number of NDPs to be transmitted (the number of NDPs to be received in STA) and/or may be information indicating whether the transmission of NDPs continues. The STA, for example, may determine whether the reception of NDPs is complete based on the information for checking completion of transmission of NDPs. The STA may then transmit an MAP selected reference feedback illustrated in FIG. 6 upon completion of reception of NDPs. Hereinafter, an indication example of the information for checking completion of transmission of NDPs to an STA from APs will be described.

Indication Example 1

In Indication Example 1, APs indicate the number of NDPs, using a newly defined trigger frame.

Figure 15:
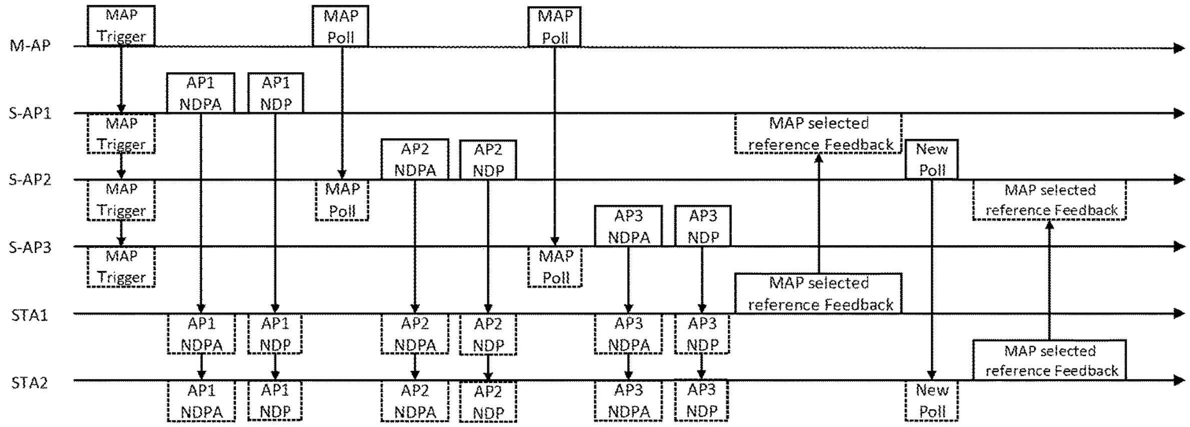
FIG. 15 is a diagram illustrating Indication Example 1 for the number of NDPs from APs to STAs.

FIG. 15 is a diagram illustrating Indication Example 1 for the number of NDPs from APs to STAs. FIG. 15 illustrates an example in which STA1 and STA2 transmit feedback information for S-AP1, S-AP2, and S-AP3 as in FIG. 6. Note that, the description of the same parts as those in FIGS. 2 and 6 is omitted in FIG. 15.

In FIG. 15, a MAP Poll transmitted from S-AP2 to STA2 illustrated in FIG. 6 has been replaced with a New Poll. The New Poll is an example of a newly defined trigger frame. The New Poll includes information indicating the number of NDPs.

The configuration of a trigger frame is not particularly limited, but may be newly defined with respect to the definition described in NPL 4, for example.

FIG. 16 is a diagram illustrating examples of Trigger Type subfield values. FIG. 16 illustrates the relationship between the types of a trigger frame described in NPL 4 and the values of the subfields for these types (see Table 9-31b in NPL 4).

In NPL 4, for example, a MAP Poll is defined as Beamforming Report Poll (BFRP) and trigger frame numbers are defined by Trigger Type subfield value of values 0 to 15 (e.g., values represented by 4 bits) illustrated in FIG. 16.

The newly defined trigger frame illustrated in FIG. 15 may be defined, for example, using an unused field (Reserved) in FIG. 16.

FIG. 17 is a diagram illustrating examples of Trigger Type subfield values in the present embodiment.

As illustrated in FIG. 17, one of the unused fields of the trigger frame number ("8-15" in the example in FIG. 16) ("8" in the example in FIG. 17) may be a trigger frame number for a newly defined trigger frame (Beamforming Report Poll to which the number of NDPs in the drawing has been added).

Note that, the newly defined trigger frame may be transmitted from S-AP1 to STA1 after transmission of AP3 NDP from S-AP3 to STA1 illustrated in FIG. 15.

Further, the information to be added in the newly defined trigger frame may be IDs of a plurality of APs that transmit NDPs.

Indication Example 2

In Indication Example 2, APs indicate the number of NDPs, using a newly defined NDPA.

Figure 18:
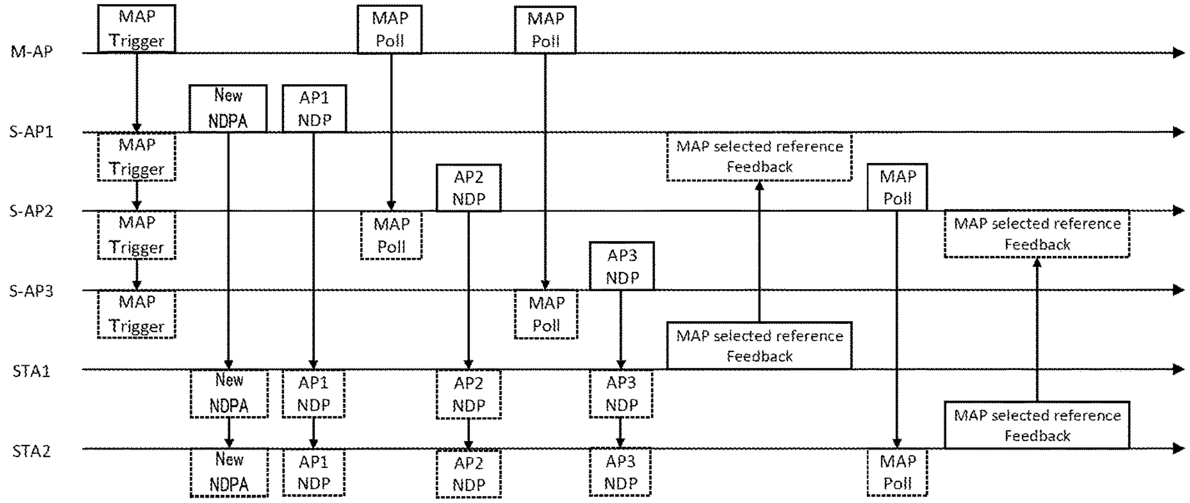
FIG. 18 is a diagram illustrating Indication Example 2 for the number of NDPs from APs to STAs.

FIG. 18 is a diagram illustrating Indication Example 2 of the number of NDPs from APs to STAs. FIG. 18 illustrates an example in which STA1 and STA2 transmit feedback information for S-AP1, S-AP2 and S-AP3 as in FIGS. 2 and 6. Note that, the description of the same parts as those in FIGS. 2 and 6 is omitted in FIG. 18.

In FIG. 6, S-AP1, S-AP2, and S-AP3 transmit NDPAs and NDPs, respectively. In FIG. 18, a "new NDPA" is defined, and an AP may indicate the number of NDPs or IDs of APs that transmit NDPs by the new NDPA.

Note that, although an example in which S-AP1 transmits anew NDPA is illustrated in FIG. 18, a plurality of S-APs or a M-AP may transmit a new NDPA.

Figure 19:
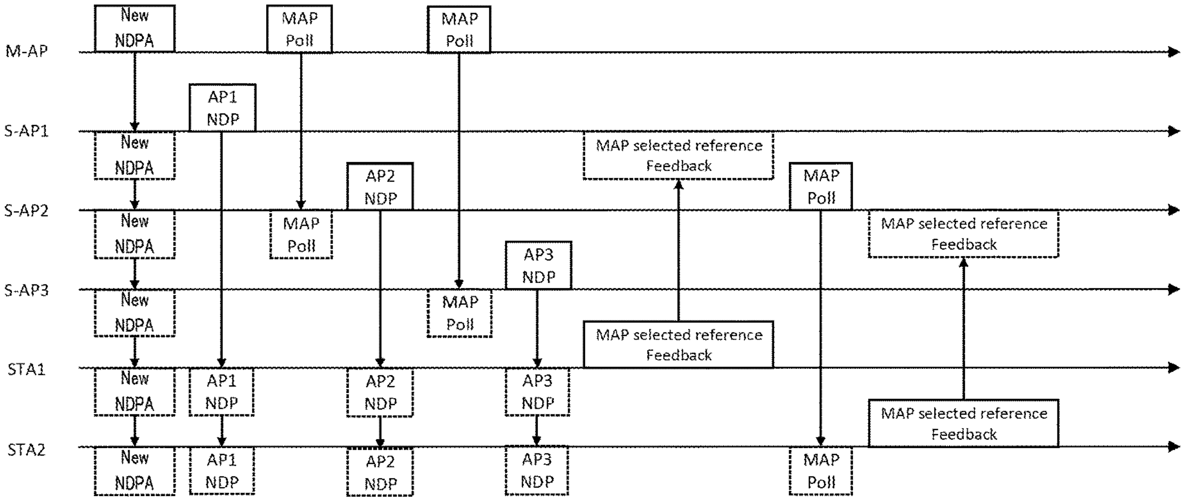
FIG. 19 is a diagram illustrating a variation of Indication Example 2 for the number of NDPs from APs to STAs.

FIG. 19 is a diagram illustrating a variation of Indication Example 2 of the number of NDPs from APs to STAs. FIG. 19 illustrates an example in which STA1 and STA2 transmit feedback information for S-AP1, S-AP2, and S-AP3 as in FIGS. 2 and 6. Note that, the description of the same parts as those in FIGS. 2 and 6 is omitted in FIG. 19.

When a M-AP transmits anew NDPA, a MAP Trigger and anew NDPA transmitted from S-AP1 need not be transmitted as illustrated in FIG. 19. Further, the M-AP may transmit a MAP Poll to S-AP1 after transmitting the new NDPA.

Indication Example 3

Indication Example 1 and Indication Example 2 illustrate an example in which the number of NDPs is indicated as an example of information for checking completion of transmission of NDPs. In Indication Example 3, whether an NDP subsequent to this NDPA (hereinafter, this NDP is referred to as "subsequent NDP") is present is indicated using an NDPA, instead of indicating the number of NDPs. The present or absence of a subsequent NDP is indicated, for example, using an unused value of the NDPA.

Figure 20:
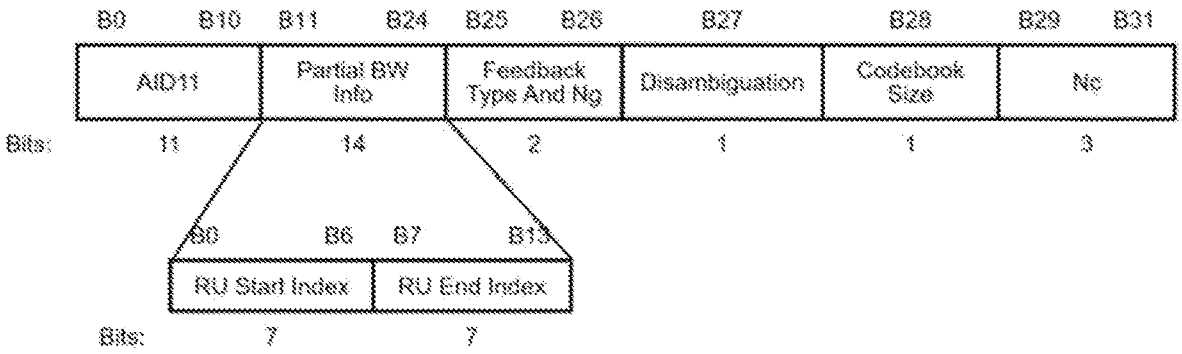
FIG. 20 is a diagram illustrating an example of an STA info subfield format in NPL 4.

FIG. 20 is a diagram illustrating an exemplary STA info subfield format in NPL 4. As an unused value, any of 74 to 127 of "RU Start index" or "RU End index" indicated by "Partial BW info" in "STA info subfield" in FIG. 20, which is an NDPA format in 11ax may be used (see FIG. 9-61*b* and FIG. 9-61*c* in NPL 4).

An operation example will be described in which RU Start index which is one of unused values is configured with 127, when a subsequent NDP is present in S-AP1, S-AP2, and S-AP3 in FIG. 6. At the stage when S-AP1 transmits an NDPA, subsequent NDPs (NDP of S-AP2 and NDP of S-AP3 in the example in FIG. 6) are present, so that AP1 transmits an NDPA in which RU Start index is changed to 127. At the stage when S-AP2 transmits an NDPA, a subsequent NDP (NDP of S-AP3 in the example in FIG. 6) is present, so that S-AP2 transmits an NDPA in which RU Start index is changed to 127 as with S-AP1. At the stage when S-AP3 transmits an NDPA, no subsequent NDP is present, so that S-AP2 transmits an NDPA in which RU Start index is changed to any value of 0 to 126 (e.g., 0).

STA1 and STA2 determine that a subsequent NDP (e.g., NDPA and NDP) is present since RU Start index of AP1 NDPA and AP2 NDPA is 127. Further, STA1 and STA2 determine that no subsequent NDP (NDPA and NDP) is present since RU Start index of AP3 NDPA is 0. When determining that no subsequent NDP (NDPA and NDP) is present, STA1 and STA2 perform selecting feedback information. Note that, STA1 and STA2 may replace the value, 127, of RU Start index of received AP1 NDPA and AP2 NDPA with a value indicated by AP3 NDPA (e.g., 0).

As described above, indicating information for checking completion of transmission of NDPs from APs to STAs allows the STAs to determine completion of reception of NDPs and thus to start controlling configuration of feedback. This makes it possible to reduce a processing load (e.g., processing time) related to the control of feedback.

Note that, feedback information may include information that identifies a transmission source of a known signal.

The feedback information (MAP selected reference feedback in the drawing) illustrated in FIG. 6 and/or the like is information including feedback information for S-AP1, S-AP2, and S-AP3, for example. Meanwhile, feedback information becomes unnecessary when the condition "Xcbf≥ΔPn>Xjt" is true in FIG. 6, for example. In this case, the number of transmission sources of known signals and the number of pieces of information on reception quality of known signals subject to feedback do not coincide with each other in some cases. In this case, since the information identifying a transmission source of a known signal is included in the feedback information, an AP that has received the feedback information can associate the information on the reception quality of the known signal with the transmission source of the known signal.

Note that, as illustrated in FIG. 6, for example, when a known signal for each AP is transmitted, the information identifying the transmission source of the known signal may be the ID of the AP. Further, when a known signal for each AP is transmitted in a frequency-multiplexed manner, the information identifying the transmission source of the known signal may be the frequency number of the frequency on which the known signal is multiplexed. Further, when a known signal is transmitted in a spatially-multiplexed manner, the information identifying the transmission source of the known signal may be a stream number on which the known signal is multiplexed. Further, when a known signal for each AP is transmitted in a code-multiplexed manner, the information identifying the transmission source of the known signal may be a code number.

Note that, feedback information for each of a plurality of APs may be individually transmitted.

Although the feedback information illustrated in FIG. 6 (MAP selected reference feedback in the drawing) includes feedback information for S-AP1, feedback information for S-AP2, and feedback information S-AP3, each of feedback information for S-AP1, feedback information for S-AP2, and feedback information S-AP3, may be transmitted in MP selected reference feedback.

Note that, feedback information may be transmitted to a plurality of transmission sources.

In the example illustrated in FIG. 6, STAs transmit feedback information to association APs STA1 in FIG. 6, for example, transmits feedback information to S-AP1 while STA2 transmits feedback information to S-AP2. The present disclosure is not limited to this example, however.

An STA may transmit feedback information to a plurality of transmission sources of known signals, for example. An STA may transmit feedback information to a plurality of APs (S-AP1, S-AP2, and S-AP3 in the example in FIG. 4). Accordingly, feedback information can be acquired by a plurality of APs, and forwarding of feedback information among APs is no longer required.

Further, an STA may transmit feedback information to a master AP, for example. This allows the master AP to manage feedback information and reduce the forwarding of information among APs. Note that, an STA that is difficult to perform transmission to the master AP may change the transmission destination of feedback information to an association AP.

In the embodiment described above, an example has been described in which a plurality of APs perform coordinated communication with respect to STAs, but the present disclosure is not limited to this example. Some of the plurality of APs, for example, may be replaced with STA(s). The present disclosure, for example, may be applied to a case where one or more APs and one or more STAs perform coordinated communication with respect to another STA. Alternatively, the present disclosure may be applied to a case where two or more STAs perform coordinated communication with respect to another STA.

The terminology used to describe each signal (each packet) in the above embodiment is exemplary, and the present disclosure is not limited to this example.

In addition, the term, such as "part" or "portion" or the term ending with a suffix, such as "-er" "-or" or "-ar" in the above-described embodiment may be replaced with another term, such as "circuit (circuitry)," "device," "unit," or "module."

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can further be applied.

The present disclosure can be realized by any kind of apparatus, device or system having a function of communication, which is referred to as a communication apparatus. Some non-limiting examples of such a communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle or mobile transportation system providing communication functionality (e.g., automotive, airplane, ship), and various combinations thereof.

The communication apparatus is not limited to be portable or movable, and may further include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control sign further data signals which are used by a communication device performing a communication function of the communication apparatus.

The communication apparatus further may include an infrastructure facility, such as a base station, an access point, and any other apparatus, device or system that communicates with or controls apparatuses such as those in the above non-limiting examples.

A radio communication apparatus according to one example of the present disclosure includes: reception circuitry, which, in operation, receives a plurality of radio signals transmitted by a plurality of transmission sources; and control circuitry, which, in operation, controls a configuration of feedback for the plurality of radio signals in accordance with a difference in reception quality among the plurality of radio signals.

In the radio communication apparatus according to one example of the present disclosure, the control circuitry controls the configuration based on a result of comparison between a threshold and a difference in the reception quality between a first transmission source and a second transmission source, the first transmission source being selected from among the plurality of transmission sources, the second transmission source being a transmission source other than the first transmission source.

In the radio communication apparatus according to one example of the present disclosure, the first transmission source is a transmission source of at least one of the plurality of radio signals that indicates a best reception quality among the plurality of transmission sources.

In the radio communication apparatus according to one example of the present disclosure, the first transmission source is a transmission source that has established an association with the radio communication apparatus.

In the radio communication apparatus according to one example of the present disclosure, the configuration of the feedback includes two or more configurations corresponding respectively to Coordinated Spatial Reuse (CSR), Coordinated Beamforming (CBF), Joint Transmission (JT), and Dynamic point Blanking (DPB).

In the radio communication apparatus according to one example of the present disclosure, when the configuration of the feedback is the configuration corresponding to Coordinated Spatial Reuse (CSR), the control circuitry includes, in the feedback, information on the reception quality in each of a plurality of blocks resulting from division of a frequency domain.

In the radio communication apparatus according to one example of the present disclosure, the reception circuitry receives control information indicating a coordination communication scheme supported by the plurality of transmission sources, and the control circuitry determines the configuration of the feedback based on information on the reception quality and the control information.

In the radio communication apparatus according to one example of the present disclosure, the control information is a threshold to be compared with the information on the reception quality.

In the radio communication apparatus according to one example of the present disclosure, the reception circuitry receives information used for determination of completion of reception of at least one of the plurality of radio signals.

In the radio communication apparatus according to one example of the present disclosure, the information used for the determination of completion of reception indicates a number of the plurality of radio signals.

In the radio communication apparatus according to one example of the present disclosure, the information used for the determination of completion of reception is included in Null data packet Announcement (NDPA) or a trigger frame.

In the radio communication apparatus according to one example of the present disclosure, the configuration of the feedback includes a configuration of information identifying at least one of the plurality of transmission sources of the plurality of radio signals.

In the radio communication apparatus according to one example of the present disclosure, the configuration of the feedback includes a configuration to transmit feedback information for each of the plurality of transmission sources, individually.

In the radio communication apparatus according to one example of the present disclosure, the configuration of the feedback includes a configuration to transmit feedback information to two or more of the plurality of transmission sources.

A radio communication method according to one example of the present disclosure includes: receiving a plurality of radio signals transmitted by a plurality of transmission sources; and controlling a configuration of feedback for the plurality of radio signals in accordance with a difference in reception quality among the plurality of radio signals.

The disclosure of Japanese Patent Application No. 2019-157100, filed on Aug. 29, 2019, including the specification, drawings and abstract, is incorporated herein by reference in its entirety.

INDUSTRIAL APPLICABILITY

An exemplary embodiment of the present disclosure is useful for mobile communication systems.

REFERENCE SIGNS LIST

10, 100 Radio communication control apparatus
11, 22 Controller
12 Transmitter
101 Known signal generator
102, 206 Transmission packet generator
103, 201 Radio transceiver
104, 202 Reception packet decoder
20, 200 Radio communication apparatus
21 Receiver
203 Reception quality measurer
204 Feedback information selector
205 Feedback information generator

The invention claimed is:

1. A radio communication apparatus, comprising:

reception circuitry, which, in operation, receives Null Data Packets (NDPs) transmitted from a plurality of transmission sources; and control circuitry, which, in operation, determines a coordination scheme used by the plurality of transmission sources in downlink coordinated transmission, from among two or more of Coordinated Spatial Reuse (CSR), Coordinated Beamforming (CBF), Joint Transmission (JT), and Dynamic point Blanking (DPB), determining whether or not to transmit feedback information of a type corresponding to the determined coordination scheme from among a plurality of types of feedback information based on a comparison between a threshold and a reception level difference, which is a difference between reception qualities of the received NDPs, and transmits the feedback information when the feedback information is determined to be transmitted.

2. The radio communication apparatus according to claim 1, wherein the control circuitry determines whether or not to transmit the feedback information based on a result of comparison between the threshold and the reception level difference between the reception quality of the NDP received from a first transmission source and the reception quality of the NDP received from a second transmission source, the first transmission source being selected from among the plurality of transmission sources, the second transmission source being a transmission source other than the first transmission source.

3. The radio communication apparatus according to claim 1, wherein the plurality of transmission sources include a first transmission source of at least one of the NDPs that indicates a best reception quality among the plurality of transmission sources.

4. The radio communication apparatus according to claim 1, wherein the plurality of transmission sources include a first transmission source that has established an association with the radio communication apparatus.

5. The radio communication apparats according to claim 4, wherein the reception circuitry receives a request for the feedback information from the first transmission source, which has established the association with the radio communication apparatus, and receives configuration information on the feedback information, the configuration information including a configuration to transmit information on the reception qualities of the NDPs received from the first transmission source.

6. The radio communication apparatus according to claim 4, wherein the control circuitry specifies a feedback destination of the feedback information as the first transmission source, which has established the association with the radio communication apparatus.

7. The radio communication apparatus according to claim 1, wherein, when the coordination scheme is CSR, the feedback information includes information on the reception qualities of a plurality of blocks resulting from division of a frequency domain.

8. The radio communication apparatus according to claim 1, wherein the control circuitry determines the coordination scheme based on the reception level difference in between the reception qualities of the received NDPs.

9. The radio communication apparatus according to claim 1, wherein the reception circuitry receives NDP Announcements (NDPAs) from the plurality of transmission sources before receiving the NDPs.

10. The radio communication apparatus according to claim 9, wherein each of the NDPAs includes feedback control information.

11. The radio communication apparatus according to claim 1, wherein the threshold is notified from one of the plurality of transmission sources.

12. The radio communication apparatus according to claim 1, wherein the control circuitry determines whether or not to transmit the feedback information based on a result of comparison between the threshold and the reception level difference between the reception qualities of the NDPs received from one of the plurality of transmission sources.

13. A radio communication method, comprising:

receiving Null Data Packets (NDPs) transmitted from a plurality of transmission sources;

determining a coordination scheme used by the plurality of transmission sources in downlink coordinated transmission, from among two or more of Coordinated Spatial Reuse (CSR), Coordinated Beamforming (CBF), Joint Transmission (JT), and Dynamic point Blanking (DPB), determining whether or not to transmit feedback information of a type corresponding to the determined coordination scheme from among a plurality of types of feedback information based on a comparison between a threshold and a reception level difference, which is a difference between reception qualities of the received NDPs, and transmitting the feedback information when the feedback information is determined to be transmitted.

* * * * *